(12) United States Patent
Eberhardt

(10) Patent No.: US 11,668,453 B2
(45) Date of Patent: Jun. 6, 2023

(54) SURFACE-MOUNTED LIGHT AND/OR CAMERA, CONNECTING PIN AND SURFACE-MOUNTED LIGHT FASTENING SYSTEM

(71) Applicant: HERBERT WALDMANN, GMBH & CO. KG, Villingen-Schwenningen (DE)

(72) Inventor: Marcus Eberhardt, Aixheim (DE)

(73) Assignee: HERBERT WALDMANN GMBH & CO. KG, Villingen-Schwenningen (DE)

( * ) Notice: Subject to any disclaimer, the term of this patent is extended or adjusted under 35 U.S.C. 154(b) by 0 days.

(21) Appl. No.: 17/360,170

(22) Filed: Jun. 28, 2021

(65) Prior Publication Data

US 2021/0404638 A1    Dec. 30, 2021

(30) Foreign Application Priority Data

Jun. 29, 2020   (DE) .......................... 102020117064.5

(51) Int. Cl.
*F21V 21/02*    (2006.01)
*F21S 8/00*    (2006.01)
(Continued)

(52) U.S. Cl.
CPC .............. *F21V 21/02* (2013.01); *F21S 8/036* (2013.01); *G03B 17/561* (2013.01); *F16B 5/0657* (2013.01)

(58) Field of Classification Search
CPC ........ F21V 21/02; F21V 21/088; F21S 8/036; G03B 17/561; F16B 5/0657;
(Continued)

(56) References Cited

U.S. PATENT DOCUMENTS 3,916,756 A    11/1975  Yoda
7,841,729 B2 *  11/2010  Geddes .................. H04N 23/56
                                                            362/16

(Continued)

FOREIGN PATENT DOCUMENTS

CN    106312641 B    9/2018
DE      9217185 U1    3/1993
(Continued)

OTHER PUBLICATIONS

Search Report dated Nov. 11, 2021 issued in corresponding European Application No. 21180036.2.
(Continued)

*Primary Examiner* — Muhammad Ijaz
(74) *Attorney, Agent, or Firm* — Nath, Goldberg & Meyer; Jerald L. Meyer

(57) ABSTRACT

The present invention relates to a surface-mounted light and/or camera (1) for arrangement on a wall (5), in particular an inside wall of a machine, having a housing (10) with a front side area (12), a rear side area (14) and side walls (13), at least one illuminant (50) and/or at least one camera (60), with at least one recess (20) being provided in the rear side area (14), in which at least one fastening means (30) is arranged, wherein the fastening means (30) in the recess (20) forms a trap which is beveled towards the rear side area (14). The present invention also relates to a connecting pin (2) for fastening the surface-mounted light and/or camera (1) to a wall (5) and a surface-mounted light and/or surface-mounted camera fastening system (3).

15 Claims, 2 Drawing Sheets

(51) Int. Cl.
*G03B 17/56* (2021.01)
*F16B 5/06* (2006.01)

(58) Field of Classification Search
CPC .............. F16B 5/0642; F16B 21/073; F21W 2131/411; B23Q 17/2404
USPC .................................................. 248/346.01
See application file for complete search history.

(56) References Cited

U.S. PATENT DOCUMENTS

| | | | | |
|---|---|---|---|---|
| 2007/0280804 | A1* | 12/2007 | Selle | F16B 5/0642 411/520 |
| 2009/0095862 | A1* | 4/2009 | Gimpel | F21V 21/02 248/231.81 |
| 2014/0191526 | A1* | 7/2014 | Lauxen | F16B 5/0628 296/1.08 |
| 2016/0100086 | A1* | 4/2016 | Chien | G06V 10/10 348/143 |
| 2016/0153644 | A1* | 6/2016 | Russikoff | F21S 4/28 362/396 |
| 2021/0404638 | A1* | 12/2021 | Eberhardt | F16B 5/0642 |
| 2021/0404639 | A1* | 12/2021 | Eberhardt | F21V 21/044 |
| 2022/0003257 | A1* | 1/2022 | Duchet | B60R 13/0206 |

FOREIGN PATENT DOCUMENTS

| | | |
|---|---|---|
| DE | 4427769 A1 | 2/1996 |
| DE | 102004018381 B4 | 11/2005 |
| EP | 2226436 A1 | 9/2010 |
| FR | 1402072 A | 6/1965 |

OTHER PUBLICATIONS

German Office Action dated Nov. 14, 2022, in corresponding application DE 10 2020 117 064.5.

* cited by examiner

SURFACE-MOUNTED LIGHT AND/OR CAMERA, CONNECTING PIN AND SURFACE-MOUNTED LIGHT FASTENING SYSTEM

The present invention relates to a surface-mounted light and/or camera for arrangement on a wall, in particular on a wall in a process chamber of a machine, having the features of claim 1, a connecting pin for fastening the surface-mounted light to a wall having the features of claim 13 and a surface-mounted light fastening system having the features of claim 17.

Surface-mounted lights and/or cameras are previously known from prior art in different embodiments—also synonymously known as attachment light and/or camera. Generic surface-mounted lights and/or cameras are used in prior art, for example, to illuminate an interior of a machine in order to be able to observe a process in a process chamber of the machine. The requirements placed on such surface-mounted lights and/or cameras are high, since they should have high power density on the one hand and must withstand the conditions in the process chamber of the machine on the other. The production process within the machine can be observed directly through a visual access means in the wall of the machine or directly via a camera, which records what is happening inside the machine either in an analog or digital way.

Such surface-mounted lights and/or cameras have proven themselves in the past, but it has turned out to be a disadvantage that the fastening means used for the surface-mounted lights and/or cameras require complex assembly and disassembly for maintenance, and also that the fastening means used for the surface-mounted light and/or camera can lead to accumulation of dirt. For example, screw connections can become so dirty over time that dismantling at a later time is no longer possible. Vibrations in the machine can also cause the screws to detach or loosen. Screw connections are also an obstacle for use in the food industry, since screw connections offer too many gaps and pockets for germs to accumulate.

This is where the present invention comes in.

It is an object of the present invention to improve the surface-mounted lights and/or cameras for arrangement on a wall, in particular an inside wall in a process chamber of a machine, known from prior art, and to eliminate the disadvantages known from prior art. The surface-mounted light and/or camera should be adapted to be fastened without tools in the interior of a machine and be held securely by fastening means even if vibrations and shocks occur.

These objects are achieved by a surface-mounted light and/or surface-mounted camera for arrangement on a wall, in particular on a wall in a process chamber of a machine, said surface-mounted light and/or surface-mounted camera having the features of claim 1, a connecting pin for establishing a connection between a wall and the surface-mounted light and/or surface-mounted camera having the features of claim 13, as well as by a surface-mounted light fastening system and/or surface-mounted camera fastening system having the features of claim 17.

Further advantageous embodiments of the present invention are specified in the dependent claims.

The surface-mounted light and/or camera according to the invention having the features of claim 1 for arrangement on a wall, in particular on an inside wall in a process chamber of a machine, has a housing with a front side area, a rear side area and side walls as well as at least one illuminant and/or at least one camera, wherein at least one recess is provided in the rear side area, in which at least one fastening means is arranged and wherein the fastening means forms a trap in the recess, which is beveled towards the rear side area. The trap is configured to make an elastic evasive movement when a connecting pin is inserted and to snap into a connection between the connecting pin and the surface-mounted lights in the manner of a catch, wherein the connection between the surface-mounted light and the connecting pin is a releasable connection, which can preferably be separated without tools.

The invention is based on the idea that the surface-mounted light and/or camera can be mounted on or demounted from a wall without tools, wherein a connecting pin only needs to be arranged on or in the wall prior to mounting. For maintenance purposes, the surface-mounted light can be detached from the wall with little force applied on the at least one fastening means and, for mounting, repositioned on the wall such that the connecting pins can engage in the recesses with the connecting means. The fastening means form a simple and stable connection, with which the surface-mounted light can be held securely in the process chamber of the machine even if vibrations and shocks occur. The fastening means are completely covered in the surface-mounted light and/or camera and no chips or dirt particles can deposit. Furthermore, a particularly fast mounting is possible by simply snapping on the surface-mounted light and/or camera, and the screwless design makes it possible to use it in the food industry.

It should be noted at this point that already that hereafter occasionally only a surface-mounted light is mentioned, however a surface-mounted light, a surface-mounted camera or a combination of a surface-mounted light with an integrated camera is always meant in this context. The surface-mounted light within the context of this invention is preferably a panel light, which is characterized in that a front side forming the front side area forms a flat surface, from which the light can emerge and/or on and/or in which the camera can be arranged. Such a surface-mounted light is typically cuboid, wherein a length and a width are many times greater than a depth. The depth describes the distance between the front side and a rear side.

A further development of the present invention provides that the fastening means has a first section, which forms the beveled trap facing the rear side area. The first section consequently protrudes increasingly into the recess as the distance from the rear side area increases. An inclined surface formed in this way pushes the fastening means aside against a spring force when the connecting bolt is inserted into the recess, until a return movement initiated by the spring force takes place to form a form fit and the fastening means engages or arrests in a notch in the connecting pin.

Furthermore, it has proven to be advantageous if the fastening means has a second section, which forms an undercut facing the front side area.

In addition, it has proven to be advantageous if the undercut formed by the second section of the fastening means widens in the direction of the front side area. The second section is typically arranged adjacent to the first section, the first section and the second section being arranged in a V-shape or arrow-shape (< or >). A dome, which is adapted to engage in the notch of the connecting pin to form the form fit, can be arranged between the first section and the second section.

While the first section facilitates an insertion of the connecting pin into the recess, the second section can facilitate the release of the form-fitting connection and can enable the at least one fastening means to make an evasive movement when the connecting pin is pulled out, by means of which the connecting pin is released. The spring force of the fastening means can specifically determine the force that is required to release the connection between the connecting pin and the surface-mounted light. In analogy to a door lock, such a design of the fastening means resembles a swing door lock or a roller latch.

A further development of the present invention provides that the fastening means is U-shaped with two legs and an intermediate section connecting the legs, and that the two legs form the trap which is beveled towards the rear side area. The respective leg can consequently form the respective one of the first section and the second section of the fastening means, the U-shaped fastening means being designed symmetrically. A fastening means shaped in this way can be produced in the simplest manner from a one-piece spring plate and enables both the holding force and the force for re-leasing the connection to be determined exactly in advance.

In addition, it has proven to be advantageous if the legs of the U-shaped fastening means sweep towards each other—meaning > <—as a result of which the respective leg is V-shaped and the two domes of the legs protrude into the recess on diametrically opposite sides.

According to a further development of the present invention, the at least one fastening means is arranged to be freely movable in the recess, as a result of which the at least one fastening means can compensate for tolerances in the recess. The positioning of the at least one connecting pin on the wall consequently does not have to be highly precise and using more than two connecting pins to fasten the surface-mounted lights on the wall also prevents sticking or jamming.

The recess preferably has an undercut, wherein the at least one fastening means is enclosed in the recess in a form-fitting manner and preferably in a loss-proof manner by the undercut. The free ends of the legs or first section of the fastening means accordingly project so far apart that the distance between them is greater than the opening of the recess in the rear side area.

A further development of the present invention provides that the at least one illuminant is provided in the housing, and that a light exit opening is provided on the front side, through which the light emitted by the at least one illuminant can exit the housing. More preferably, the at least one illuminant may be an LED illuminant. More preferably, a plurality of illuminants may be arranged in the housing, which illuminants may furthermore be arranged in a predetermined grid, preferably in one plane. The respective LED has a main emission direction, which points in the direction of the light exit opening.

According to a further preferred embodiment of the present invention, a light-permeable plate is arranged in the light exit opening, which plate has an optical section for the at least one illuminant. The optical section is preferably arranged in alignment with the respective illuminant and configured to emit light as homogeneously as possible into the room or the process chamber of the machine. The optical section may be modeled after an optical lens and may be concave and/or convex.

Furthermore, it has proven to be advantageous if the at least one illuminant is movably arranged in a plane parallel to the light-permeable plate, whereby the relative position between the at least one illuminant and the optical section can be changed. By changing the relative position between the at least one illuminant and the optical section, the light emitted by the at least one illuminant can be deflected by the optical section, whereby the surface-mounted lights can emit the light in any direction. In the event that a plurality of illuminants is movably arranged together in the plane, an optical section is preferably provided for each of the illuminants.

In addition, it can be advantageous if the camera is arranged entirely or partially in the light exit opening. The camera is preferably recessed into the housing in the light exit opening and illuminants are arranged around the camera. The light is preferably emitted parallel to the optical axis of the camera, as a result of which the area observed by the camera is optimally illuminated and shadows are avoided. It is also possible that, in addition to the at least one illuminant in the housing, at least one further illuminant is arranged in the camera. It is also possible for the camera to have the at least one illuminant. It is also preferred for the camera to be arranged to be pivotable in at least one, preferably in two spatial directions.

Another aspect of the present invention relates to a connecting pin for establishing a connection between a wall and a surface-mounted light, in particular a surface-mounted light described above. The connecting pin is formed along an axis and has a connecting means for fastening the connecting pin to the wall and a plug portion, wherein the plug portion is arranged in the axis adjacent to the connecting portion. In addition, the plug portion has a notch.

The connecting pin is preferably an approximately rotationally symmetric rod which can be attached to the wall, in particular the inside wall of the machine, by means of the connecting means. The connecting pin protrudes perpendicularly from the wall, which is preferably designed as a flat plate.

A further development of the connecting pin provides that the notch is designed as a circumferential groove around the axis. The notch is preferably spaced apart from the connecting means and thus arranged between the connecting means and a free end of the plug portion, and is thus positioned such that the notch protrudes completely into the recess when the connecting pin is inserted into the recess of the surface-mounted light.

According to a further development of the connecting pin, the connecting means can be configured to establish a screw connection, a screw clamping, a latching connection and/or a rivet connection with the wall. The connecting pin can also be attached to the wall by means of a welded, glued and/or press-fit connection. The connecting means does not necessarily have to connect the connecting pin to the wall in a rotationally fixed manner, as it is only necessary that the connecting means generate a sufficiently high holding force, which is preferably greater than the holding force of the fastening means of the surface-mounted light in the at least one recess in the rear side area. The connecting means may be configured, for example, to form a groove connection, wherein the connecting pin may be designed as a blind rivet. Such a connecting pin is sleeve-shaped and has a rivet shank, a swage head and the plug portion, wherein the plug portion is arranged on the side of the swage head facing away from the rivet shank.

Furthermore, it has proven to be advantageous if the plug portion is designed to be conical at a free end. The conical free end of the connecting pin facilitates the insertion of the plug portion into the recess with the at least one fastening means of the sur-face-mounted light and/or surface-mounted camera.

A third and final aspect of the present invention relates to a surface-mounted light and/or surface-mounted camera fastening system for fastening a surface-mounted light to a wall with a surface-mounted light, in particular a surface-mounted light and/or camera described above, and at least one connecting pin, in particular a connecting pin described above, with a connecting means by which the connecting pin can be fastened to the wall and a plug portion, wherein the surface-mounted light has at least one recess in a rear side area into which the at least one connecting pin or the plug portion of the at least one connecting pin can be adjusted, and wherein the at least one fastening means forms a trap, which is beveled towards the rear side area and which can engage in a notch in the plug section to form a form fit.

According to a further development of the surface-mounted light fastening system and/or the surface-mounted camera fastening system, it can be advantageous if the fastening means exerts a spring force on the plug portion of the connecting pin in a form-fitting manner, by means of which the plug portion is pulled into the recess. The surface-mounted light is pressed firmly against the wall by the spring force, whereby any gap between the wall and the surface-mounted light is closed. In particular, it can be advantageous if a rubber seal is arranged on the rear side area of the surface-mounted light, which under the action of the spring force closes the gap between the wall and the surface-mounted light in a liquid-tight manner.

An exemplary embodiment of the present invention is described in detail below with reference to the accompanying drawings. In the drawings.

Identical or functionally identical components in an exemplary embodiment are identified below with the same reference symbols. For the sake of clarity, not all parts that are the same or functionally the same in the individual Figures are provided with a reference number.

Figure 1:
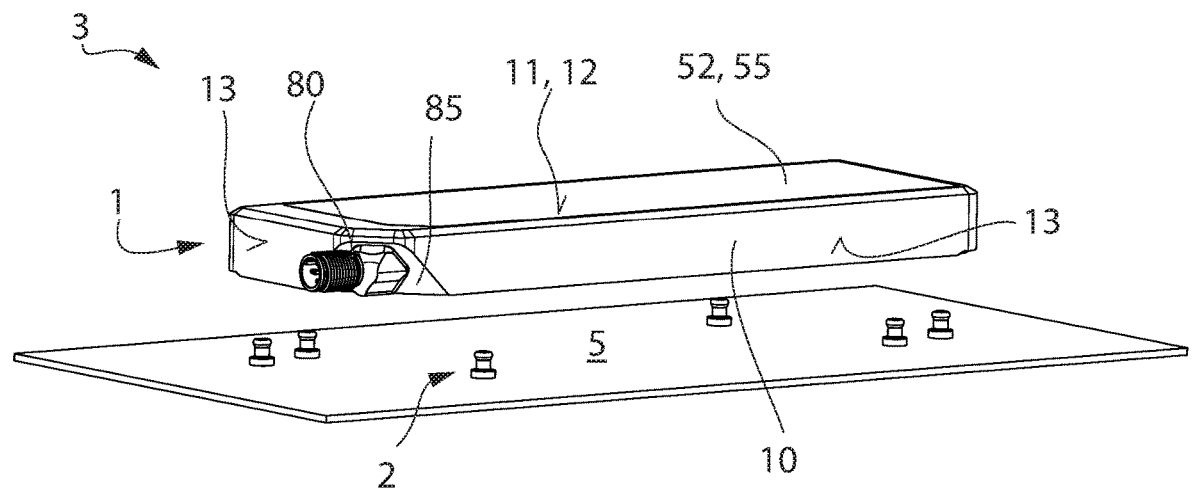
FIG. 1 shows a perspective exploded view of a surface-mounted light fastening system, comprising a surface-mounted light and six connecting pins fastened to a wall.

The exploded view according to FIG. 1 shows a surface-mounted light fastening system 3, which comprises a surface-mounted light 1 and six connecting pins 2. The surface-mounted light fastening system 3 is used to fasten the surface-mounted light 1 on a wall 5, which is preferably designed as a flat plate. The wall 5 can be an inside wall of a machine (not shown), which encloses a process chamber, in which the machining of workpieces can take place, at least in some areas. Such walls 5 may be formed from a plate-shaped material with a wall thickness t, wherein the material typically is a metallic material. The wall 5 has a first side and a second side opposite the first side, wherein the first side of the wall 5 is facing the process chamber.

The surface-mounted light 1 comprises a housing 10 with a front side area 12 and a rear side area 14, wherein the rear side area 14 is able to form an abutment face which can abut against the wall 5. The rear side area 14 has a rear side 15 and the front side area 12 has a front side 11, wherein, in the assembled state of the surface-mounted light 1 according to FIG. 3, the front side 11 is arranged at a distance from the first side of the wall 5 and the rear side 15 can abut against the first side of the wall 5.

The housing 10 is preferably of a cuboid design and, as illustrated, can have four side walls 13, wherein the housing 10 has a width B, a length L and a depth H.

Figure 2:
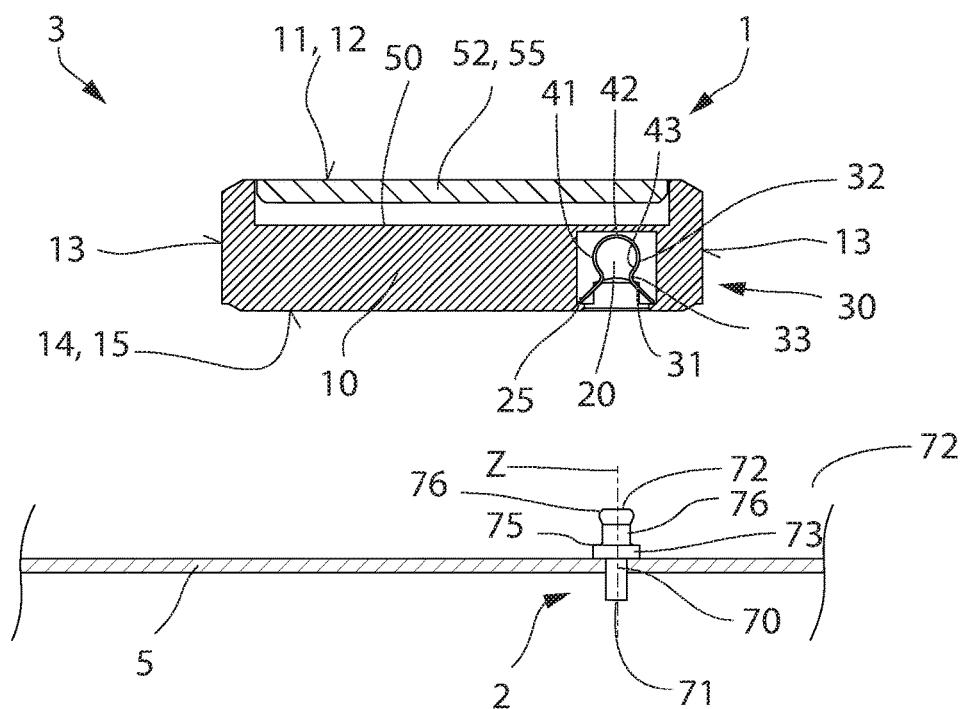
FIG. 2 shows a sectional view of the exploded view according to FIG. 1.
Figure 3:
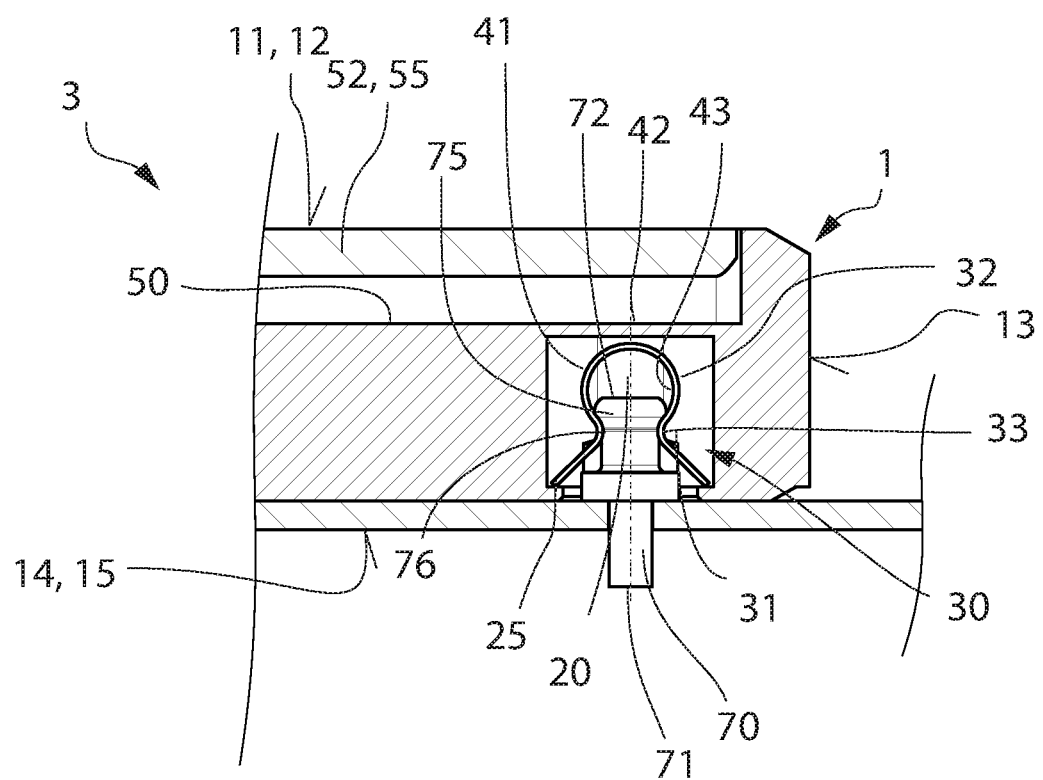
FIG. 3 shows a sectional view of the surface-mounted light fastening system according to FIGS. 1 and 2, wherein the surface-mounted light is fastened to the wall by means of the connecting pins.

One or more illuminants 50, which are not illustrated in detail, may be arranged in the housing 10. In FIGS. 2 and 3, their approximate arrangement is indicated by the reference symbols.

The illuminants 50 are preferably LED illuminants 50, which are preferably arranged in a grid on one or more plates. In addition, the housing 10 has a housing opening 52 in the front side area, through which the light emitted by the illuminants 50 can be emitted. The housing opening 52 may be closed by a light-permeable plate 55.

At this point it should be noted that, for the sake of simplicity, only a surface-mounted light 1 with illuminants 50 is described in detail in the exemplary embodiments. In addition to or instead of the at least one illuminant 50, a camera 60 (not illustrated) may be provided, which may be arranged in the front side area 12, preferably within the light exit opening 52.

To fasten the surface-mounted light 1 on the wall 5, a plurality of fastening means 50 is provided in the rear side area 14 and is arranged within a recess 20 accessible from the rear side 15 through an opening 21.

The recess 20 extends from the rear side 15 in the rear side area 14 in the direction of the front side area 12 and may be designed as a cylindrical blind hole or as a cuboid pocket. The recess 20 also has an undercut 25. The opening 21 has a width W1 and in the area of the undercut 25 the recess 20 has a width W2, wherein width W1>W2.

In the recess 20, the fastening means 30 is enclosed by the undercut 25 in a form-fitting manner and can be arranged freely movable in the recess 20 in order to compensate for tolerances.

The fastening means 30 is preferably made in one piece from a flexible material and is approximately U-shaped. The fastening means 30 has a first leg 41 and a second leg 43 as well as an intermediate section 42, which connects the first leg 41 to the second leg 43. The fastening means 30 may be designed mirror-symmetrically or line-symmetrically, wherein the respective leg 41, 43 may have a first section 31 and a second section 32. The first section 31 forms a trap which is beveled in the direction of the front side area 12, whilst the second section 32 forms an undercut. A dome 33 is formed between the first section 31 and the second section 32. The first leg 41 and the second leg 43 with the two sections 31, 32 are thus aligned to sweep towards each other. The free ends of the legs 41, 43 stand apart in a funnel shape, wherein the two free ends are preferably arranged at a distance A that is greater than the width W1 of the opening 21 and less than or equal to the width W2 of the undercut 25.

As can be seen in particular from FIGS. 2 and 3, the connecting pin 2 has a connecting portion 70 and a plug portion 75, which are arranged adjacent in an axis Z, and extends between a first end area 71 and a second end area 72, which is a has free end. The connecting portion 70 is adapted to establish a connection with the wall 5, and the plug portion 75 is configured to be plugged into the recess 20 of the surface-mounted light 1 and to establish a form-fitting and/or frictional connection with the fastening means 30 in the recess 20. The connecting portion 70 has a head 73, which abuts against the wall 5 and specifies an immersion depth in the wall 5 of the connecting pin 2.

The connecting portion 70 is formed in the first end area 71 and may have a thread or latching means (not illustrated) by means of which the connecting pin 2 can be fastened to the wall 5 in an assembly opening 6. The connecting portion 70 can establish a non-rotatable connection to the wall 5, but a non-rotatable connection between the connecting pin 2 and the wall 5 is not absolutely necessary.

The connecting pin 2 may be designed as a sleeve-shaped blind rivet and have a rivet shank and a swage head, wherein the rivet shank can be deformed by a rivet mandrel penetrating the connecting pin 2 such that the wall 5 is fastened between the area of the rivet shaft for plastic deformation and the swage head, which forms the head 73.

The plug portion 75 is arranged in the second end area 72 and protrudes from the wall 5, preferably perpendicular to the wall 5, and also has a notch 76 which is designed as a circumferential groove around the Z axis. The notch 76 is arranged between the free end of the second end area 72 and the connecting portion 70.

Furthermore, the free end of the plug portion 75 in the second end area 72 may be conical or rounded.

When the connecting pin 2 or the plug portion 75 is inserted into the recess 20 of the surface-mounted light 1, the trap, which is beveled towards the rear side area and formed by the fastening means 30, is forced into an evasive movement until the fastening means 30 can snap into the notch 76.

When inserting the plug portion 75, the free end of the second end area 72 forces the first section 31, which forms the trap and which is tapered towards the rear side area 14, into an elastic evasive movement, whereby the two legs 41, 43 are spread apart and the free end of the second end area 72 can penetrate the undercut formed by the second section 32 of the legs 41, 43. As soon as the dome 33 engages the notch 76 of the plug portion 75, the legs 41, 42 are pushed back and the domes 33 of the two legs 41, 43 engage in the notch 76 on diametrical sides. As a result of the configuration of the second section 32, the plug portion 75 is pulled in the direction of the front side area 12, as a result of which the surface-mounted light 1 is pressed against the wall 5.

In order to detach the surface-mounted light 1 from the wall 5, a tensile force must be applied to the surface-mounted light 1, which presses the fastening means 30 out of the form fit with the notch 76 and the surface-mounted light 1 is released.

Furthermore, a seal may be arranged on the rear side 15, by means of which any remaining gap between the wall 5 and the surface-mounted light 1 is sealed. For removal, a removal slot may also be formed on the housing 10 in the rear side area 14, in which, for example, a tool for removing the surface-mounted light 1 can be inserted. The form fit between the fastening means 30 and the connecting pin 2 can be released by a lever movement.

Furthermore, as shown in FIG. 1, the surface-mounted light 1 may have a beveled surface 85, which connects two side walls 13 to the rear side 15 or the front side 11, wherein the beveled surface 85 is angled at an angle of 45° to the front side 11 or the rear side 15. An electrical connection 80 may be provided on the beveled surface, wherein the electrical connection 80 preferably is rotatable by ±180°. The electrical connection 80 may have latching means, by means of which the alignment of the pivotable connection 80 may be determined.

LIST OF REFERENCE SYMBOLS

1 Surface-mounted light
2 Connecting pin
3 Light and/or camera fastening system
5 Wall
6 Assembly opening
10 Housing
11 Front side
12 Front side area
13 Side walls
14 Rear side area
15 Rear side
20 Recess
21 Opening
25 Undercut
30 Fastening means
31 First section
32 Second section
33 Dome
25 Undercut
41 First leg
42 Intermediate section
43 Second leg
50 Illuminant
52 Light exit opening
55 Plate
58 Optical section
60 Camera
70 Connecting portion
71 First end area
72 Second end area
73 Head
75 Plug portion
76 Notch
80 Connection
85 Surface

The invention claimed is:

1. At least one of a surface-mounted light and a camera (1) for arrangement on a wall (5), comprising:
   a housing (10) with a front side area (12), a rear side area (14) and side walls (13); and
   at least one of at least one illuminant (50) and at least one of the camera (60),
   wherein at least one recess (20) is provided in the rear side area (14), in which at least one fastening means (30) is arranged,
   wherein the at least one fastening means (30) forms a trap in the recess (20) which is beveled towards the rear side area (14),
   wherein the at least one fastening means (30) is a U-shaped unitary body with two legs (41, 43), wherein an intermediate section (42) connects the two legs (41, 43), and wherein the two legs (41, 43) form the trap, the trap being beveled towards the rear side area (14),
   wherein the at least one fastening means (30) is freely movable in the recess (20), and
   wherein the recess (20) has an undercut (25), and wherein the at least one fastening means (30) is enclosed in the recess (20) in a form-fitting manner by means of the undercut (25).

2. The at least one of a surface-mounted light and a camera (1) according to claim 1, characterized in that the fastening means (30) has a first section (31), which forms the trap being beveled facing the rear side area (14).

3. The at least one of a surface-mounted light and a camera (1) according to claim 1, characterized in that the fastening means (30) has a second section (32), which forms an undercut (35) facing the front side area (12).

4. The at least one of a surface-mounted light and a camera (1) according to claim 3, characterized in that the undercut (35) formed by the second section (32) widens in the direction of the front side area (14).

5. The at least one of a surface-mounted light and a camera (1) according to claim 1, characterized in that the two legs (41, 43) are designed to sweep towards one another.

6. The at least one of a surface-mounted light and a camera (1) according to claim 1, characterized in that the at least one illuminant (50) is provided in the housing (10), and that a light exit opening (52) is provided on a front side (11), from which a light emitted by the at least one illuminant (50) can exit the housing (10).

7. The at least one of a surface-mounted light and a camera (1) according to claim 1, characterized in that a light-permeable plate (55) is arranged in a light exit opening (52), which light-permeable plate has an optical section (58) for the at least one illuminant (50).

8. The at least one of a surface-mounted light and a camera (1) according to claim 1, characterized in that a plurality of illuminants (50) is provided in a grid, and/or in that the illuminants (50) are movable in one plane.

9. The at least one of a surface-mounted light and a camera (1) according to claim 1, characterized in that the camera (60) is arranged in a light exit opening (52).

10. A connecting pin (2) for establishing a connection between the wall (5) and the at least one of the surface-mounted light and the camera (1) according to claim 1, with an axis (Z), having: a connecting portion (70) for fastening the connecting pin (2) to the wall (5) and a plug portion (75) arranged in the axis (Z) adjacent to the connecting portion (70), wherein the plug portion (75) has a notch (76).

11. The connecting pin (2) according to claim 10, characterized in that the connecting portion (70) is configured to establish a screw connection, a screw clamping or a rivet connection with the wall (5).

12. The connecting pin (2) according to claim 10, characterized in that the notch (76) is designed as a circumferential radial groove around the axis (Z).

13. The connecting pin (2) according to claim 10, characterized in that the plug portion (75) is conical in an end area (72).

14. A fastening system (3) for fastening the at least one of a surface-mounted light and a camera (1) according to claim 1 to the wall (5), comprising:
the at least one of the surface-mounted light and the camera (1) according to claim 1; and
at least one connecting pin (2) according to claim 13, with a connecting portion (70), with which the connecting pin (2) can be fastened to the wall (5) and a plug portion (75),
wherein the at least one of the surface-mounted light and the camera (1) has the at least one recess (20) in a rear side area (14), into which the at least one connecting pin (2) can be inserted, and
wherein the at least one fastening means (30) forms the trap, which is beveled towards the rear side area (14) and which can engage in a notch (76) in the plug portion (75) to form a form fit.

15. The fastening system (3) according to claim 14, characterized in that the at least one fastening means (30) exerts a spring force on the plug portion (75) when in form fit, by means of which spring force the plug portion (75) is pulled into the at least one recess (20).

* * * * *